United States Patent [19]

Ellis et al.

[11] 4,067,936
[45] Jan. 10, 1978

[54] FLUID-FLUID CONTACT APPARATUS

[75] Inventors: Stephen Robert Mercer Ellis; Ronald Priestley, both of Birmingham; Kevin Joseph McKeown, Newcastle, all of England

[73] Assignee: Mass Transfer Limited, Newcastle, England

[21] Appl. No.: 687,092

[22] Filed: May 17, 1976

Related U.S. Application Data

[60] Division of Ser. No. 445,961, Feb. 26, 1974, Pat. No. 3,957,931, which is a continuation of Ser. No. 209,969, Dec. 20, 1971, abandoned.

[30] Foreign Application Priority Data

Dec. 18, 1970 United Kingdom ............... 60280/70
Oct. 4, 1971 United Kingdom ............... 46165/71

[51] Int. Cl.² .................................................. B01F 3/04
[52] U.S. Cl. ............................ 261/98; 261/DIG. 72
[58] Field of Search ................................... 261/94–98, 261/DIG. 72; 210/150

[56] References Cited

U.S. PATENT DOCUMENTS

| | | | |
|---|---|---|---|
| 2,212,932 | 8/1940 | Fairlie | 261/DIG. 72 |
| 2,639,909 | 5/1953 | Leva | 261/DIG. 72 |
| 3,200,877 | 8/1965 | Lehmer et al. | 261/DIG. 72 |
| 3,266,787 | 8/1966 | Eckert | 261/DIG. 72 |
| 3,365,180 | 1/1968 | Lerner | 261/DIG. 72 |
| 3,506,248 | 4/1970 | Starbuck et al. | 261/DIG. 72 |
| 3,618,910 | 11/1971 | Arndt | 261/DIG. 72 |

FOREIGN PATENT DOCUMENTS

| | | | |
|---|---|---|---|
| 2,049,072 | 4/1971 | Germany | 261/98 |
| 1,107,201 | 5/1961 | Germany | 261/98 |

*Primary Examiner*—Tim R. Miles
*Attorney, Agent, or Firm*—Wigman & Cohen

[57] ABSTRACT

This disclosure relates to packing elements for fluid-fluid contact apparatus of the packed tower type. The packing elements comprise open-ended tubular members of any desired cross-sectional configuration having a maximum transverse dimension or diameter greater than its width in the axial direction, and having one or more protuberances or ribs extending inwardly from the inside wall of the member. Additionally, the overall length of the packing element is at least as great as the diameter of the tubular portion thereof, and none of the protuberances extend the whole of the length of the packing element.

12 Claims, 32 Drawing Figures

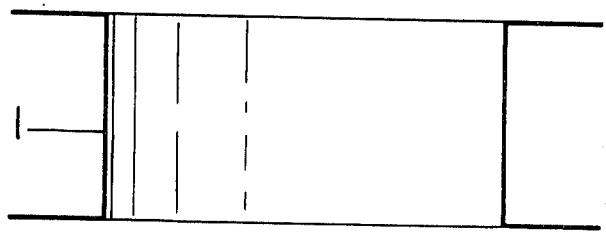
FIG. 6.
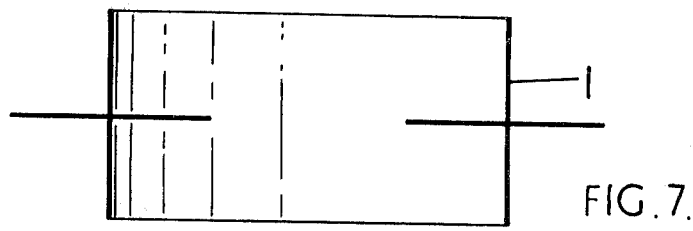
FIG. 7.
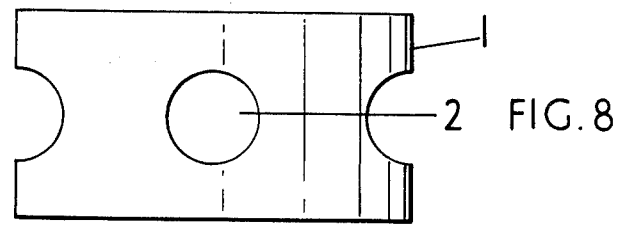
FIG. 8.
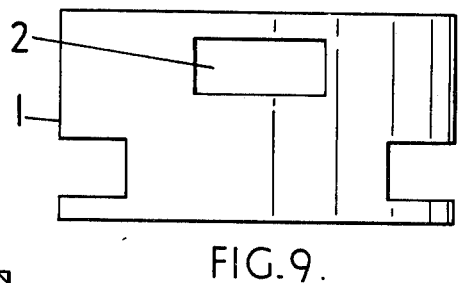
FIG. 9.
FIG. 10.
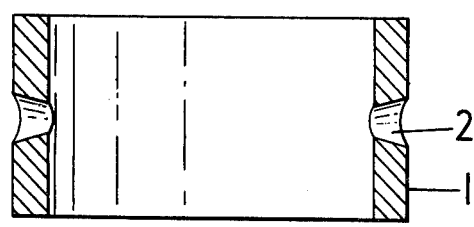

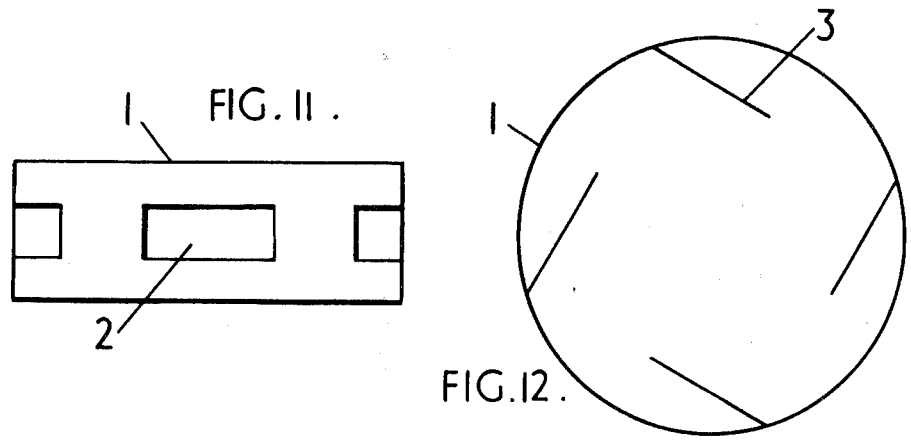
FIG. 11.
FIG. 12.
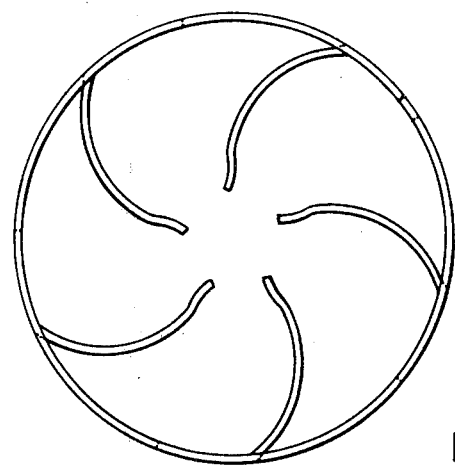
FIG. 13.
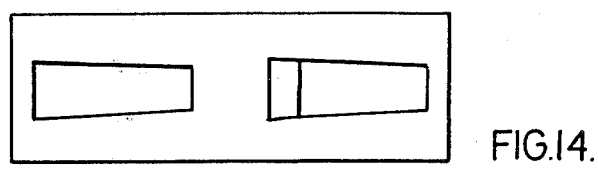
FIG. 14.

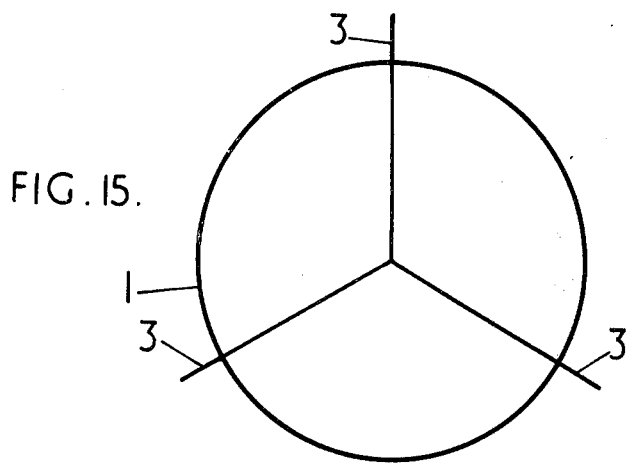
FIG. 15.
FIG. 16.
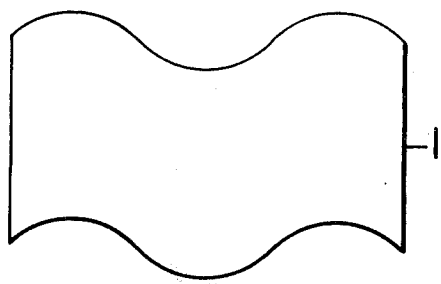
FIG. 17.
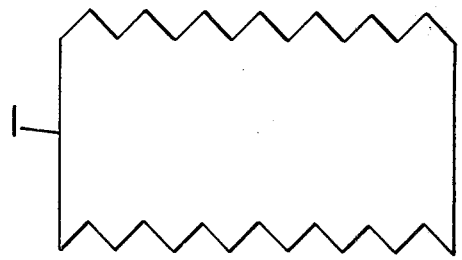
FIG. 19.
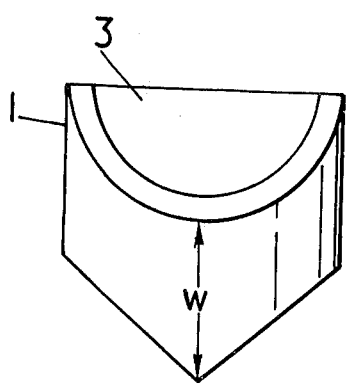
FIG. 18.
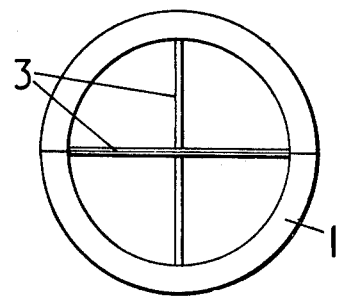

FLUID-FLUID CONTACT APPARATUS

CROSS-REFERENCE TO RELATED APPLICATIONS

This application is a division of copending application Ser. No. 445,961, filed Feb. 26, 1974, now U.S. Pat. No. 3,957,931, which, in turn, was a continuation of Ser. No. 209,969, filed Dec. 20, 1971, now abandoned.

This invention is concerned with fluid-fluid contact apparatus of the packed tower type.

Fluid-fluid contact apparatus of the packed tower type for effecting mutual gas (vapour)/liquid and liquid/liquid contact is well known.

Basically, fluid-fluid contact apparatus of the packed tower type comprises a tower or other structure containing one or more beds of packing elements and having means for introducing the fluids to be brought into contact with each other into said bed. In many applications, the fluids are brought into contact in countercurrent flow, the more dense fluid (i.e. the liquid in the case of gas (vapour)/liquid contact apparatus) flowing downwardly through the packed bed whilst the less dense fluid (i.e. the gas or vapour in the gas of gas(-vapour)/liquid contact apparatus) flows upwardly through the bed. In other applications (e.g. cross-flow cooling towers) the fluids flows are generally at right angles to each other, for example with a liquid flowing downwardly through the bed whilst a gas or vapour flows across the bed. It is not that necessary that both fluids be forcibly fed to the bed and thus, for example, in the case of a so-called sewage filtration bed, liquid effluent is irrigated onto the surface of a packed bed through which is allowed to permeate (usually without forced flow) to permit aerobic biological treatment of the effluent. The present invention is concerned with all apparatus in which two different fluids are brought together in a packed bed for some action between them.

A wide variety of packing elements are known for such apparatus, for example, fabricated packings such as Raschig rings, Berl saddles, Intalox saddles and Pall rings. In the case of packing elements such as Raschig rings or Pall rings the bed may be stacked beds (i.e. beds in which the element are individually placed in position) or dumped beds, (i.e. beds in which at least a portion of the elements have been dumped in situ in the apparatus). In the case of the saddles the beds will almost always be "dumped" beds.

The nature of the packing will of course affect the performance of the apparatus and it is an object of this invention to provide fluid-fluid contact apparatus packed with packing elements leading to improved liquid/liquid or gas(vapour)/liquid contact with the apparatus.

Broadly, the present invention consists in fluid-fluid contact apparatus comprising a packed bed and means for introducing fluids to said bed for contact therein in which at least a part of the bed is a dumped bed formed of packing members each comprising an open ended tubular member the maximum transverse dimension of which in a plane perpendicular to its length (hereinafter referred to as its "diameter") is greater than its maximum surface measurement in a plane parallel to its length (hereinafter referred to as its "width"), and which has one or more ribs or protrusions extending inwardly from the inside wall of the member. In accordance with a modification thereof the invention also provides fluid-fluid contact apparatus of the type described above wherein the packing elements comprise grids formed of fused elements having a diameter greater than their length and, suitably, having one or more ribs or protrusions extending inwardly from the inside walls elements. In the following description it will be understood that reference to possible modification of the single elements also refers to possible modification of grids formed thereof.

In the following description, reference will be made to the accompanying drawings illustrating packing elements for use in the apparatus of the invention, and in which:

FIG. 6 is a diametric section (omitting the internal ribs) through a packing element having channel-shaped walls;

FIG. 7 is a diametric section through a packing element having cruciform side walls;

FIG. 8 is a side elevation of a packing element having circular aperture in the walls thereof in the same plane;

FIG. 9 is a side elevation of a packing element having rectangular apertures in the side walls thereof in different planes;

FIG. 10 is a diametric section through a thick-walled packing element having venturi-like apertures in the walls thereof;

FIG. 11 is a side view of a packing element having tabbed apertures;

FIG. 12 is a plan view of the packing element shown in FIG. 11;

FIG. 13 is a plan view of a packing element having curved tabbed apertures;

FIG. 14 is a side view of the packing element shown in FIG. 13;

FIG. 15 is a plan view of a packing element also having outwardly directed radial ribs;

FIG. 16 is a diametric section (omitting the internal ribs) through a packing element having sinuous edges;

FIG. 17 is a diametric section (omitting the internal ribs) through a packing element having serrated edges;

FIG. 18 is a side elevation of a packing element having developed toothed or peaked edges and diametric ribs;

FIG. 19 is a plan view of the packing element shown in FIG. 18;

Figure 1:
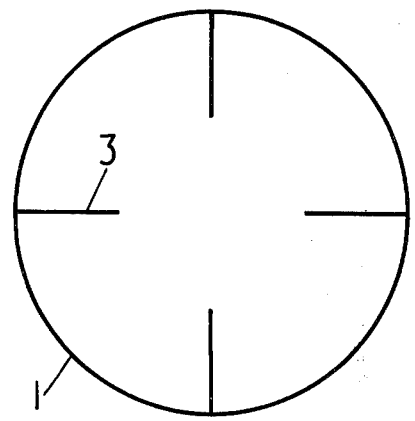
FIG. 1 is a plan view of a packing element having partially inwardly extending radial ribs.

In the drawings reference numbered 1 refers to the cylindrical member, reference numbered 2 to any apertures therein, reference numbered 3 to any ribs or projections, reference numbered 4 to any hubs and reference numbered 5 to any subsidiary rings or collars.

The tubular members forming the packing elements used in the apparatus of the invention may be of any desired cross-section, curvilinear and/or polygonal, and when made of metal, for example, need not necessarily be sealed closed tubes, the edges closing the tube merely abutting each other. Thus, for example, the tubular element may be triangular, rectangular (preferably square), hexagonal, elliptical or circular in cross-section. In practice, it is generally preferred that the tubular element of circular cross-section(and, for the sake of simplicity the elements shown in the drawings are all of circular cross-section).

The packing elements of the invention are provided with inwardly directed ribs or protrusions extending from the inner walls thereof and it is generally preferred that these ribs are flat in at least one dimension.

Figure 2:
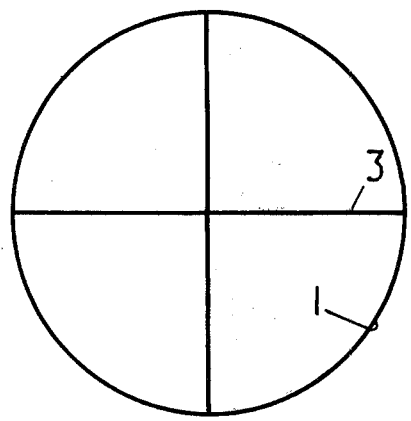
FIG. 2 is a plan view of a packing element having diametric ribs.
Figure 3:
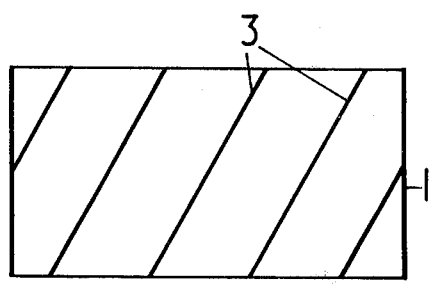
FIG. 3 is a diametric section through a packing element having inclined partially inwardly extending inwardly directed ribs.

The inwardly directed ribs may extend the whole of the length of the packing element or only a part thereof and may extend radially from the walls or at an angle thereto. Further, the ribs may be continuous diametrical or radial ribs (FIG. 2) or may only extend a part of the way into the inner part of the packing element (FIG. 1). The ribs may be parallel to the longitudinal axis of the packing element, normal thereto or at an angle thereto (FIG. 3).

The inwardly directed ribs or protrusions extending partially or wholly across the tubular member tend to improve the alignment of the packing members in a bed thereof; i.e. to increase the percentage of elements having a more generally favourable alignment by preventing individual elements from "nesting" in each other.

In addition to the inwardly directed ribs, the tubular members may be provided with other modifications so that their configuration departs from that of a right tube on the same crosssection.

Figure 4:
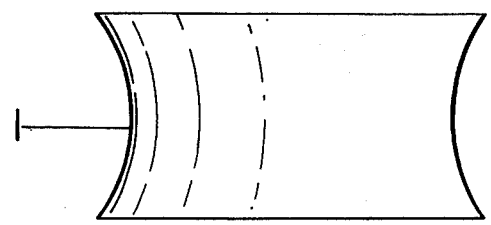
FIG. 4 is a diametric section through a packing element (omitting the internal ribs) having concave side walls.
Figure 5:
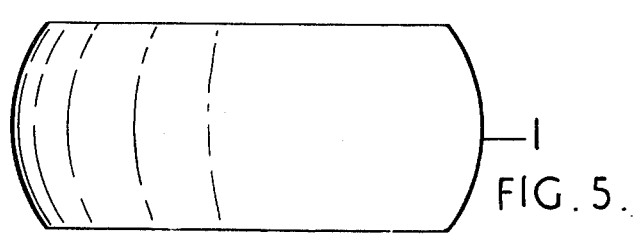
FIG. 5 is a diametric section (omitting the internal ribs) through a packing element having convex side walls.
Figure 20A:
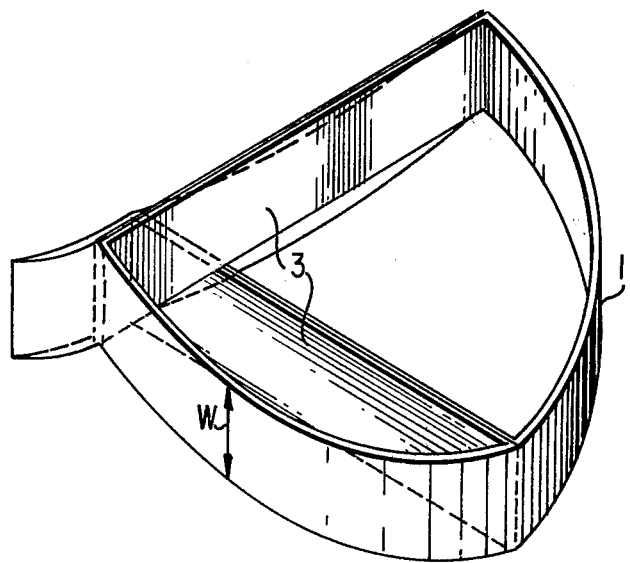
FIG. 20a is a perspective view of the packing element of FIG. 20.
Figure 18A:
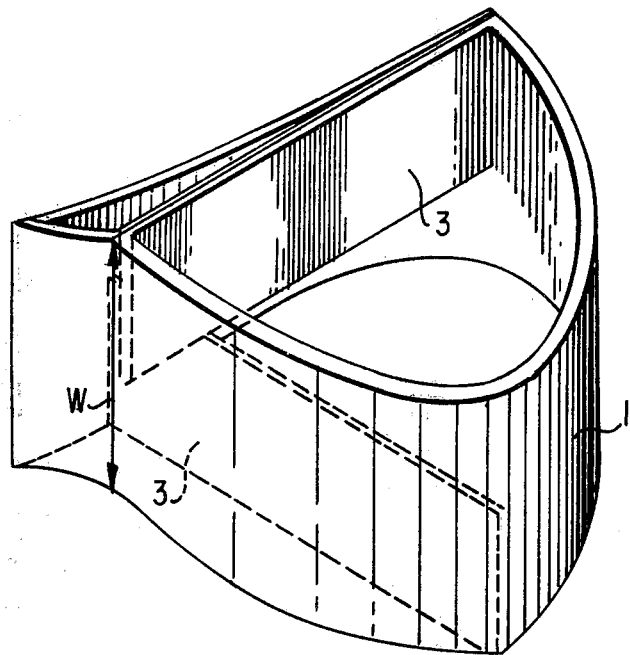
FIG. 18a is a perspective view of the packing element of FIG. 18.
Figure 20:
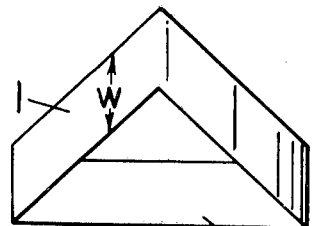
FIG. 20 is a side elevation of another packing element having developed toothed or peaked edges and diametric ribs.
Figure 21:
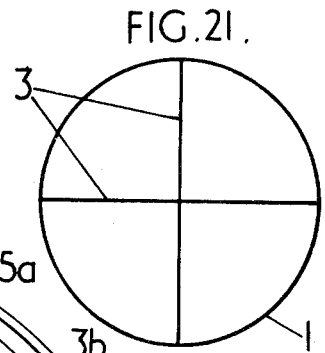
FIG. 21 is a plan view of the packing element shown in FIG. 20.

Thus, the physical configuration of the tubular member may be further modified by:

a. modifying the shape of the side walls of the cylindrical member;
b. introducing holes or apertures into the walls of the cylindrical member;
c. providing additional ribs or like protrusions extending outwardly from the walls or edges of the cylindrical member;
d. providing the edges of the cylindrical member with a non-linear configuration; or
e. roughening the surface(s) of the walls of the cylindrical member.

Where the shape of the walls of the tubular member is modified, the walls may, for example, be concave (FIG. 4), convex (FIG. 5), channel-shaped (FIG. 6), cruciform (FIG. 7), hyperbolic or parabolic in section.

The holes or apertures in the walls of the packing element may, for example, be circular, eliptical, square or rectangular in shape (see FIGS. 8 and 9). Where the packing element is a thick-walled element, the cross section of the hole may vary through the thickness of the wall so as to provide a venturi-like arrangement (FIG. 10; the internal ribs are omitted for the sake of clarity). The tower packing element may suitably be provided with two or more holes in the walls thereof and these may be suitably arranged equidistantly around the circumference of the wall and may or may not be in the same radial plane (FIGS. 8 and 9). The holes or apertures in the walls may be large enough to permit the throughflow of liquid and vapour or small so as to permit only the transfer of liquid therethrough. The holes or apertures may be associated with internal ribs, i.e. in the case of a metallic element the ribs may take the form of tabs punched out to form apertures in the walls (FIGS. 11, 12,13 and 14).

Ribs or protuberances extending outwardly from the walls may extend the whole of the height or length of the walls and may be parallel to (FIG. 15) or, preferably, at an angle to the longitudinal axis of the tower packing element. The ribs may also extend around the walls of the cylindrical member and, for example, the packing element shown in FIG. 7 can be regarded as having inwardly and outwardly directed circumferential ribs.

Where the edges of the packing element are non-linear, they may be, for example, serrated or sinuous in form (see FIGS. 16 and 17).

The tower packing elements having a serrated edge may take a "developed" form, e.g. as shown in FIGS. 18-21 each edge of the cylindrical member having developed peaks, each element being provided with a pair of diametric ribs extending between the peaks.

Figure 22:
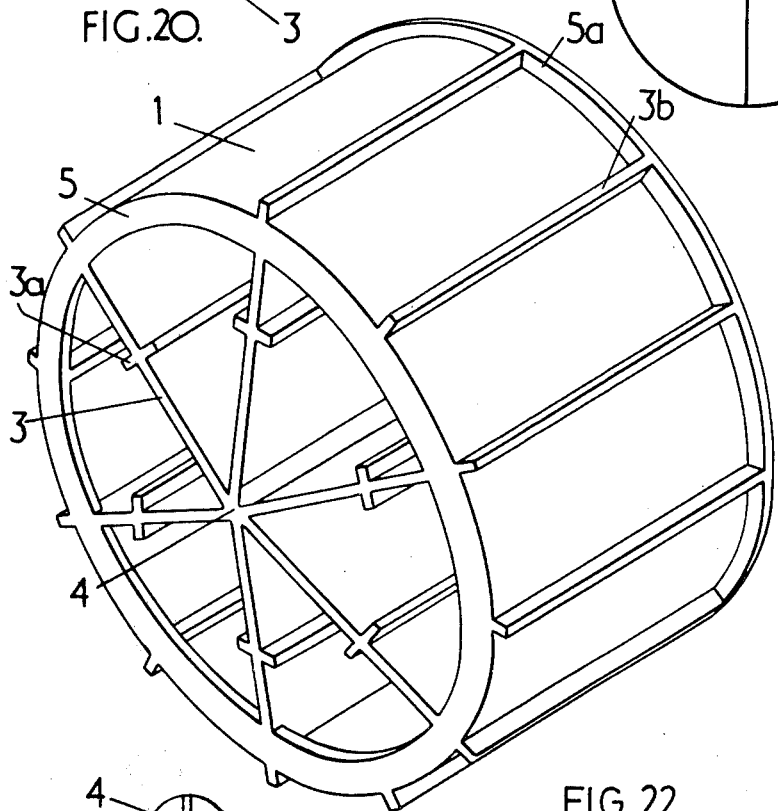
FIG. 22 is a perspective view of a packing element having an extended hub and radial ribs connecting therewith.

The tower packing elements of the invention may be provided with a combination of modifications, for example a combination of apertures and ribs or protuberances referred to above and the ribs themselves may be ribbed (FIG. 22). The packing element provided with ribs and/or apertures may also have a non-linear, for example, a serrated edge, as described above.

It is often helpful that the inwardly directed ribs meet to form a "hub" which extends beyond the plane of the end of the tubular member (see FIG. 22) since this modification will tend to prevent the elements from aligning themselves directly on each other and thereby occluding each other. The hub can also be shorter than the distance between the planes of the ends of the tubular member or only one end thereof may extend beyond the plane of the end of the tubular member.

Similarly, the packing element may be provided with elongated members extending from each end of the tubular member and inclined towards the longitudinal axis of the tubular member. Suitably, in this case, there will be two or more elongated members extending from each end of the cylindrical member, the elongated arms not terminating at a point on the longitudinal axis of the tubular member but terminating in a collar or ring-like member coaxial with the tubular member and spaced therefrom. In this latter case, the two collars at each end may not necessarily be the same distance from the centre of the tubular ring but are, preferably, at equal distances. The packing element wherein the elongated members terminate in ring or collars will generally be mechanically stronger than in which the elongated members terminate at a point.

Figure 23:
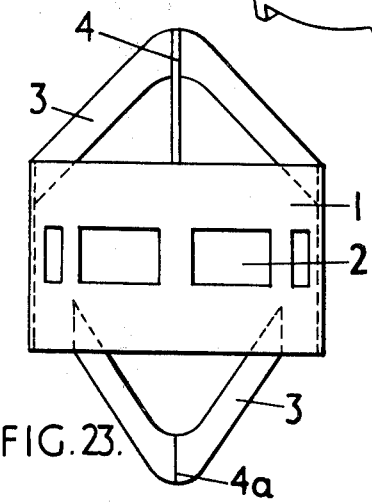
FIG. 23 is a side elevation of a packing element having longitudinally extending ribs meeting on the longitudinal axis of the cylindrical member.
Figure 24:
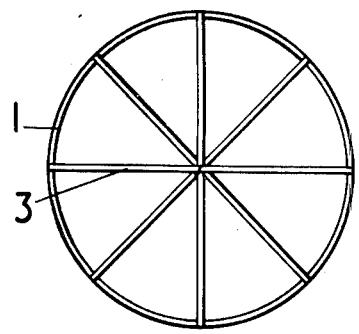
FIG. 24 is a plan view of the packing element shown in FIG. 23.

Thus, referring to FIGS. 23 and 24 of the drawings, a tower packing element comprises a cylindrical member 1, having apertures 2 and having extending from each end thereof elongated members 4, terminating at apexes 4 and 4a respectively.

The walls of the tubular member may be apertured and, if desired, these apertures may be provided with tabs extending therefrom as in the conventional Pall ring and, further, these tabs may be angled to the longitudinal axis of the cylindrical member.

In accordance with another preferred embodiment of the invention the cylindrical element is provided with a single central collar or cylinder connected thereto by means of radial ribs (FIGS. 27 – 30).

As stated above the packing elements used in the apparatus of the invention have a maximum diameter greater than their maximum width. Preferably the ratio of their diameter to their width will be more than 1.5: — but will preferably be less than 10: 1, advantageously the ratio will be in the range 2:1 – 5:1 and, particularly, in the range 2:1 – 4:1.

Figure 25:
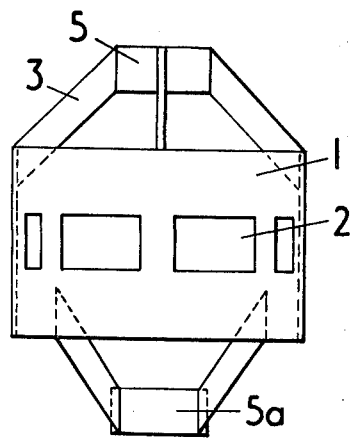
FIG. 25 is a side elevation of a packing element having longitudinally extending ribs connected to collars.
Figure 26:
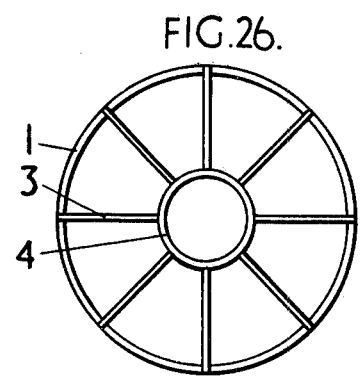
FIG. 26 is a plan view of the packing element shown in FIG. 25.
Figure 27:
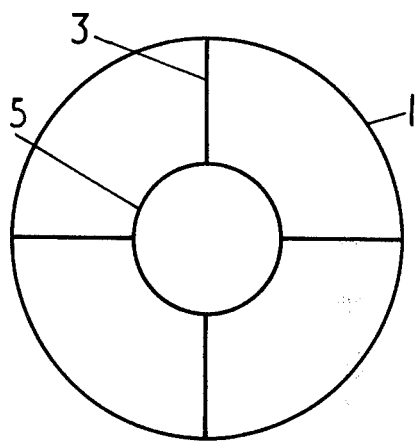
FIG. 27 is a plan view of a packing element having a central collar connected to the cylindrical element by radial ribs.
Figure 28:
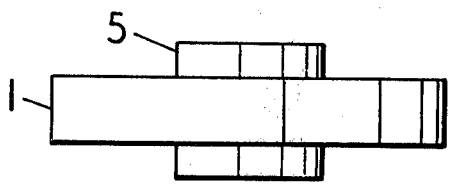
FIG. 28 is a side elevation of the packing element shown in FIG. 27.
Figure 29:
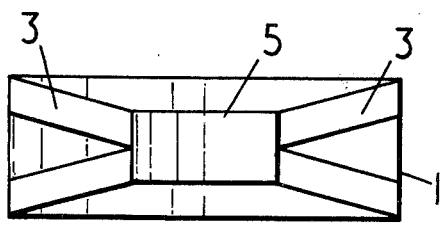
FIG. 29 is a diametric section through another packing element having a central collar connected to the cylindrical element by radial ribs.
Figure 30:
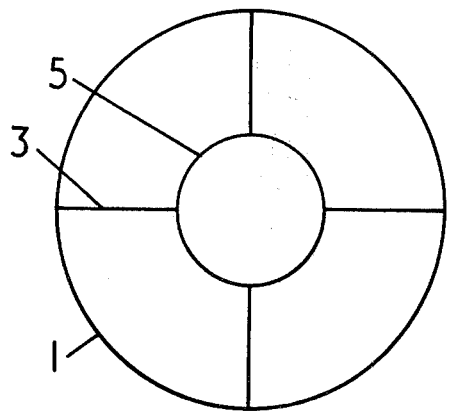
FIG. 30 is a plan view of the packing element shown in FIG. 29.

It should be noted that the width of an element is not necessarily the same as its total or overall length and, for example, the width of the elements shown in FIGS. 16, 17, 18 and 20 is less than their overall length as is that of the elements shown in FIGS. 22, 23 and 25 whereas the width of the element shown in FIGS. 3, 4, 5, 6 and 7 is the same as their overall length.

The actual physical size of the packing elements will of course depend upon their intended use and purpose but, in general, the packing element may be found useful when the ratio of their diameter to that of the bed is in the range 1:3 to 1:30.

The basic conformation of the packing elements used in the invention tends to lead to packing of the element in a vessel or column so that the packing orientates itself to the vessel walls in such a manner as to encourage the transfer of liquid running down the column wall back into the mass of the packing. In addition, the tower packing element will tend to improve the efficiency of a packed column in that liquid migration to the vessel walls tends to be reduced. Further, pressure drop may be reduced.

In general it may be said that the tower packing elements used in the apparatus of the invention in which the width is approximately the same as the overall length (i.e. those in which the diameter is greater than the overall length) tend to align themselves so that a larger percentage of them is aligned in a generally horizontal manner than is the case of corresponding conventional packings having an overall length to diameter ratio of greater than unity. The resultant packed bed generally shows a decreased pressure drop as compared with similar beds of conventional packing elements and more particularly show a markedly enhanced capacity. Thus, packed beds of elements as shown in FIG. 13 and FIG. 14 of the drawings showed an increase in capacity of up to 30% as compared with comparable packed beds of equal thickness of conventional Pall rings of about the same diameter.

The tower packing elements in which the overall length of the element is markedly greater than the width(say 50% greater or more), e.g. those shown in FIGS. 18–21 and 23–26, tend to orient themselves in a different fashion to those in which the width and length are approximately the same. Thus, such elements have a shape tending to that of a regular polyhedron, e.g. a tetrahedron, and, consequently, their orientation is more random but at the same time they fit together to form a more favourable three-dimensional orientation than is the case for conventional tower packing elements.

The tower packing elements used in the invention may be formed of any suitable material for example, of ceramic material, plastics material, or metal or multilayers of gauzes or meshes formed therefrom. In the case of elements formed of ceramics these will generally have a relatively thick wall section and, similarly, any ribs or protuberances there will similarly be generally thick. The tower packing elements of the invention formed of plastics material may be prepared, for example, by an injection moulding technique and the material of which they are formed should, of course, be chemically resistant to the materials with which it is intended that the packing element be brought in contact. Suitable materials include, for example, reinforced or unreinforced thermoplastic materials.

Tower packing elements formed of metals such as stainless steel or mild steel will generally have apertures and/or ribs formed therein by stamping and cutting operations and will generally be of fairly thin section.

The apparatus of the invention may take any of the forms in which packed beds of elements are utilized to effect fluid-fluid contact; for example it may take the form of distillation, absorption, desorption, water-cooling, biological treatment (e.g. effluent "filtration"), gas-scrubbing, gas-humidification, liquid-liquid extraction apparatus, general microbiological wash or any combination thereof.

The bed(s) of packing elements within the apparatus are simply prepared by dumping the elements into the bed. Where the apparatus is of the cross-flow type it may be advisable to turn the elements in the bed through 90° and this may be achieved by physically turning the bed on a suitable support or by flooding the apparatus.

The invention also provides a method of contacting a fluid with another fluid which comprises bringing the fluids into contact in an apparatus according to the invention.

We claim:

1. A packing element of a given overall length comprising an open-ended tubular member of given width and having a diameter to width ratio greater than unity, the overall length of said packing element being at least as great as the diameter of said tubular member, a plurality of protuberances extending inwardly from the inside wall of said tubular member, none of said protuberances extending the whole length of said packing element, and wherein said protuberances include a plurality of arms extending outwardly beyond each end of said tubular member and meeting only at a region disposed outwardly from the respective end thereof, thereby defining flow-through paths extending generally perpendicular to the longitudinal axis of the packing element and between the respective end of said tubular member and said arms.

2. A packing element as defined in claim 1 wherein said arms abut one another at said region.

3. A packing element as defined in claim 1, wherein said arms abut a circular collar at said region.

4. A packing element of a given overall length comprising an open-ended tubular member of given width and having a diameter to width ratio greater than unity, the overall length of said packing element being at least as great as the diameter of said tubular member, a plurality of protuberances extending inwardly from the inside wall of said tubular member, none of said protuberances extending the whole of the length of said packing elements, and wherein said tubular member is a truncated cylinder having first and second planar surfaces at one end thereof inclined toward each other defining a first peak, and third and fourth planar surfaces at the other end thereof inclined toward each other and defining a second peak.

5. A packing element as defined in claim 4, wherein said peaks are disposed generally perpendicular to one another.

6. A packing element as defined in claim 4, wherein said peaks are disposed generally parallel to one another.

7. Fluid-fluid contact apparatus comprising a packed bed and means for introducing fluids to said bed for contact therein in which at least a part of said bed is a dumped bed formed of packing elements each of a given overall length and including an open-ended tubular member of given width and having a diameter to width ratio greater than unity, the overall length of said packing element being at least as great as the diameter of said tubular member, a plurality of protuberances extending inwardly from the inside wall of said tubular member, none of said protuberances extending the whole of the length of said packing elements, and wherein said protuberances include a plurality of arms extending outwardly beyond each end of said tubular member and meeting only at a region disposed outwardly from the respective end thereof, thereby defining flow-through paths extending generally perpendicular to the longitudinal axis of the packing element and between the respective end of said tubular member and said arms.

8. Fluid-fluid contact apparatus as defined in claim 7, wherein said arms abut one another at said region.

9. Fluid-fluid contact apparatus as defined in claim 7, wherein said arms abut a circular collar at said region.

10. Fluid-fluid contact apparatus comprising a packed bed and means for introducing fluids to said bed for contact therein in which at least a part of said bed is a dumped bed formed of packing elements each of a given overall length and including an open-ended tubular member of given width and having a diameter to width ratio greater than unity, the overall length of said packing element being at least as great as the diameter of said tubular member, a plurality of protuberances extending inwardly from the inside wall of said tubular member, none of said protuberances extending the whole of the length of said packing element, wherein said tubular member is a truncated cylinder having first and second planar surfaces at one end thereof inclined toward each other defining a first peak, and third and fourth planar surfaces at the other end thereof inclined toward each other and defining a second peak.

11. Fluid-fluid contact apparatus as defined in claim 10, wherein said peaks are disposed generally perpendicular to one another.

12. Fluid-fluid contact apparatus as defined in claim 10, wherein said peaks are disposed generally parallel to one another.

* * * * *